(12) United States Patent
Sato

(10) Patent No.: US 11,546,484 B2
(45) Date of Patent: Jan. 3, 2023

(54) IMAGE FORMING APPARATUS AND IMAGE FORMING METHOD

(71) Applicant: TOSHIBA TEC KABUSHIKI KAISHA, Tokyo (JP)

(72) Inventor: Toshiyuki Sato, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 16/994,039

(22) Filed: Aug. 14, 2020

(65) Prior Publication Data

US 2021/0306512 A1 Sep. 30, 2021

(30) Foreign Application Priority Data

Mar. 25, 2020 (JP) .............................. JP2020-053957

(51) Int. Cl.
*H04N 1/32* (2006.01)
*G06K 19/077* (2006.01)
*H04N 1/00* (2006.01)
*G06K 1/12* (2006.01)

(52) U.S. Cl.
CPC ......... *H04N 1/32138* (2013.01); *G06K 1/121* (2013.01); *G06K 19/0776* (2013.01); *G06K 19/07773* (2013.01); *H04N 1/00572* (2013.01)

(58) Field of Classification Search
CPC ....... H04N 1/32138; H04N 2201/3205; H04N 1/00572; H04N 1/00334; H04N 1/00307; H04N 2201/006; H04N 2201/0094; H04N 1/00342; H04N 1/00588; H04N 1/00591; H04N 1/00599; H04N 1/00602; H04N 1/00604; H04N 1/00612; H04N 1/00633; H04N 1/00652; H04N 1/0084; H04N 1/00864; H04N 1/32625; H04N 1/32673; H04N 1/32678; H04N 1/00; G06K 15/408; G06K 1/121; G06K 17/0025; G06K 19/0776; G06K 19/07773; G06K 19/0723; G06K 19/07749; G06K 3/00; G06K 7/00; G06F 3/1285; G06F 3/1293; H04W 12/04; H04W 12/06; H04W 12/50; H04W 4/80; H04W 84/12
USPC ........................................................ 358/1.15
See application file for complete search history.

(56) References Cited

U.S. PATENT DOCUMENTS 10,657,429 B2 * 5/2020 Takada ............... G06K 17/0025
11,347,168 B1 * 5/2022 Ueta ...................... G03G 13/34
2003/0227528 A1 * 12/2003 Hohberger ....... G06K 19/07749
347/104

(Continued)

FOREIGN PATENT DOCUMENTS

JP 2011-051344 A 3/2011

*Primary Examiner* — Negussie Worku
(74) *Attorney, Agent, or Firm* — Foley & Lardner LLP

(57) ABSTRACT

An image forming apparatus includes a printing unit, a reversing unit, a writing unit, and a control unit. The printing unit forms an image on a sheet-like medium to which a wireless tag is attached. The reversing unit reverses a front and back of the medium. The writing unit writes data on the wireless tag. The control unit controls the reversing unit so that the medium is reversed twice upon the writing of data on the wireless tag failing and controls the printing unit so that an image indicating that the writing of data fails is formed on the medium reversed twice.

11 Claims, 6 Drawing Sheets

(56) References Cited

U.S. PATENT DOCUMENTS

| | | | | |
|---|---|---|---|---|
| 2004/0257601 | A1* | 12/2004 | Tomiyasu | G06K 19/07758 455/66.1 |
| 2005/0002720 | A1* | 1/2005 | Hohberger | B65H 37/002 400/611 |
| 2005/0120260 | A1* | 6/2005 | Suzuki | G06F 11/0733 714/5.1 |
| 2006/0072142 | A1* | 4/2006 | Shiraishi | H04N 1/00864 358/1.14 |
| 2008/0204818 | A1* | 8/2008 | Nakano | H04N 1/32384 358/1.15 |
| 2008/0239379 | A1* | 10/2008 | Ito | H04N 1/00209 358/1.15 |
| 2018/0067439 | A1* | 3/2018 | Watanabe | G03G 15/6538 |
| 2018/0239289 | A1* | 8/2018 | Takada | G03G 15/5029 |
| 2019/0180155 | A1* | 6/2019 | Takada | G06K 17/0025 |
| 2021/0229950 | A1* | 7/2021 | Ishikawa | H04N 1/00612 |
| 2021/0309484 | A1* | 10/2021 | Mitsuno | B65H 43/04 |
| 2022/0197733 | A1* | 6/2022 | Tomiyama | B41J 3/4075 |

* cited by examiner

IMAGE FORMING APPARATUS AND IMAGE FORMING METHOD

CROSS-REFERENCE TO RELATED APPLICATION

This application is based upon and claims the benefit of priority from Japanese Patent Application No. 2020-053957, filed Mar. 25, 2020, the entire contents of which are incorporated herein by reference.

FIELD

Exemplary embodiments described herein relate to an image forming apparatus and an image forming method.

BACKGROUND

There is an image forming medium in which printing paper having a wireless tag attached thereto is used and data is written on the wireless tag together with printing on the printing paper. On such an image forming medium, if the writing of data on the wireless tag fails, an image for notifying a user of this failure is printed. The user, however, may not recognize the image.

DETAILED DESCRIPTION

Figure 1:
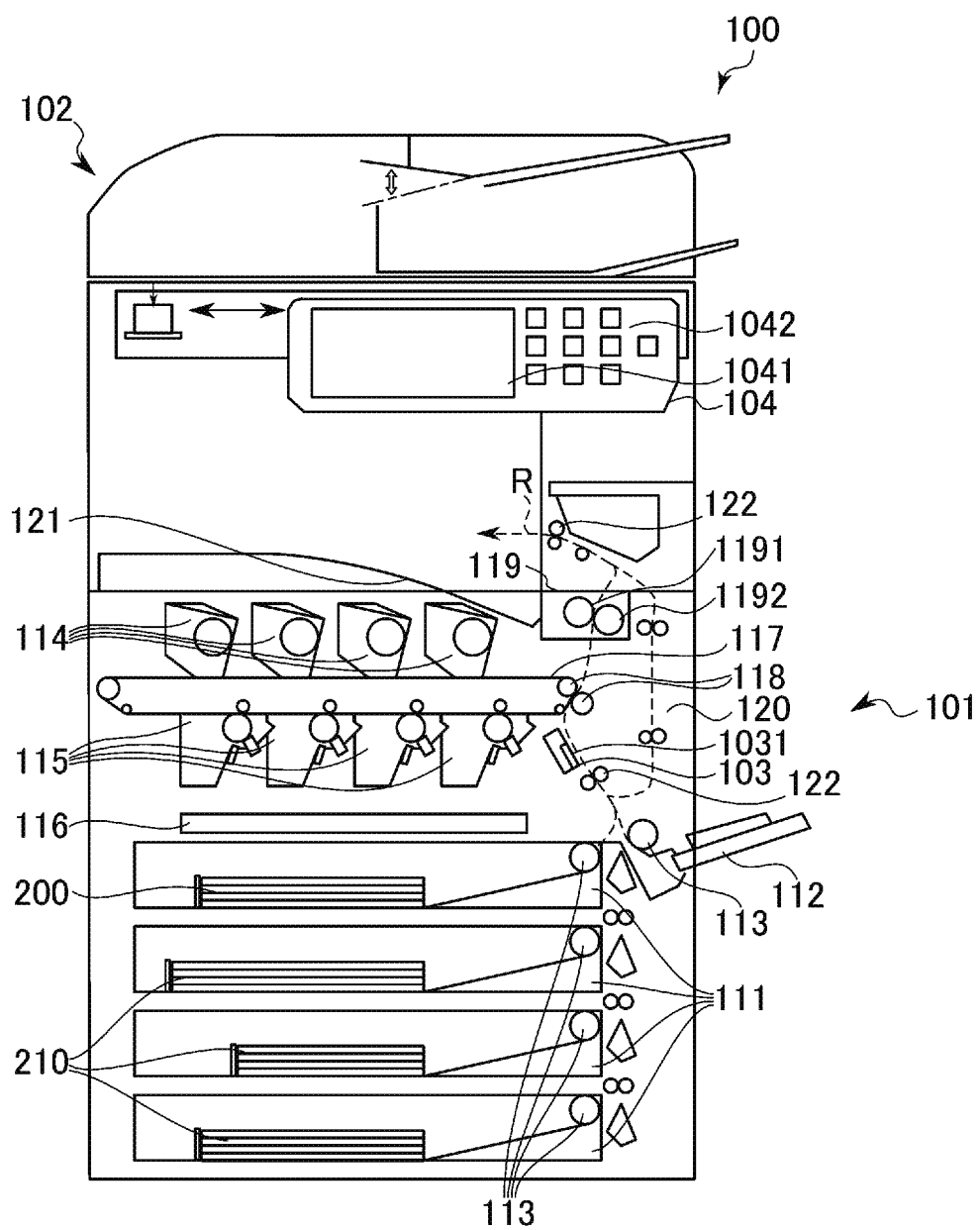
FIG. 1 is a diagram showing an example of a schematic configuration of an image forming apparatus according to at least one embodiment.

An object to be achieved by the exemplary embodiment is to provide an image forming apparatus and an image forming method for notifying a user that the writing of data on a wireless tag attached to printing paper or the like fails so that the user may easily recognize the failure.

According to at least one embodiment, an image forming apparatus includes a printing unit (printer), a reversing unit (double side), a writing unit (writer), and a control unit (controller). The printing unit forms an image on a sheet-like medium to which a wireless tag is attached. The reversing unit reverses a front and back of the medium. The writing unit writes data on the wireless tag. The control unit controls the reversing unit so that the medium is reversed twice upon the writing of data on the wireless tag failing and controls the printing unit so that an image indicating that the writing of data fails is formed on the medium reversed twice.

Hereinafter, an image forming apparatus according to the embodiment will be described with reference to the drawings. In the drawings used for the description of the following embodiments, the scale of each part may be appropriately changed. The drawings used in the description of the following embodiments may be shown with the configuration omitted for the sake of explanation. In the drawings and the present specification, the same reference numerals indicate similar elements. In the present specification, in order to distinguish "omotemen" in Japanese from "hyomen" in Japanese, "omotemen" in Japanese is referred to as a "front surface", and "hyomen" in Japanese is referred to as a "surface".

FIG. 1 is a diagram showing an example of a schematic configuration of an image forming apparatus 100 according to at least one embodiment.

The image forming apparatus 100 is, for example, a multifunction peripheral (MFP), a copy machine, a printer, or a fax machine. However, the image forming apparatus 100 will be described below as an MFP. The image forming apparatus 100 includes, for example, a printing function, a scan function, a copy function, a data writing function, and a facsimile function.

The printing function is a function of forming an image on the image forming medium by using a recording material such as toner or ink. Characters or the like is also a type of image. The image forming apparatus 100 shown in FIG. 1 is an image forming apparatus that uses toner. Here, the image forming medium is, for example, sheet-like paper for printing, and types thereof include a tag built-in medium 200 and an untagged medium 210.

Figure 2:
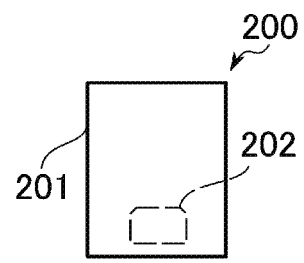
FIG. 2 is a diagram showing an example of a tag built-in medium.

FIG. 2 is a diagram showing an example of the tag built-in medium 200.

The tag built-in medium 200 is an image forming medium to which a wireless tag 202 is attached. As shown in FIG. 2, the tag built-in medium 200 includes a paper portion 201 and the wireless tag 202.

The paper portion 201 is, for example, sheet-like paper having the wireless tag 202 attached thereto, by embedding a wireless tag 202 therein or the like.

The wireless tag 202 is a tag capable of reading and writing data by wireless communication. The wireless tag 202 is, for example, a radio frequency (RF) tag using a radio frequency identifier (RFID). The wireless tag 202 is typically a passive wireless tag that operates using received radio waves as a power source.

Meanwhile, the untagged medium 210 is an image forming medium to which a wireless tag is not attached. The untagged medium 210 is, for example, sheet-like paper.

The scan function is a function of reading an image from a manuscript or the like on which the image is formed.

The copy function is a function of printing an image read from a manuscript or the like using the scan function on the image forming medium by using the printing function.

The data writing function is a function of writing data on the wireless tag 202 attached to the tag built-in medium 200. If the writing of the data on the wireless tag 202 fails, the image forming apparatus 100 forms an image indicating that the writing of data fails on the image forming medium. Here, forming the image indicating that the writing of data fails on the image forming medium is referred to as "void printing".

The image indicating that the writing of data fails, which is printed in the void printing, includes, for example, a reference symbol such as an x mark. Alternatively, the image may include a character string indicating that the writing of data fails.

The image forming apparatus 100 in FIG. 1 includes, for example, a printer 101, a scanner 102, a reader and writer 103, and an operation panel 104.

The printer 101 forms (prints) an image on an image forming medium. The printer 101 includes, for example, a paper feeding tray 111, a manual feeding tray 112, a paper feeding roller 113, a toner cartridge 114, an image forming unit 115, an optical scanning device 116, a transfer belt 117, a secondary transfer roller 118, a fixing unit 119, a double side unit 120, a conveyance roller 121 and a discharge tray 122.

The printer 101 is an example of a printing unit that forms an image on the tag built-in medium 200.

The paper feeding tray 111 is a tray storing an image forming medium used in printing. The image forming apparatus 100 includes one or a plurality of paper feeding trays 111. At least one among the paper feeding trays 111 stores the tag built-in medium 200 as an image forming medium. Other zero or more paper feeding trays 111 store the untagged medium 210 as the image forming medium.

FIG. 2 is a diagram showing an example of the tag built-in medium 200.

The tag built-in medium 200 may be an image forming medium to which the wireless tag 202 is attached. As shown in FIG. 2, the tag built-in medium 200 includes the paper portion 201 and the wireless tag 202.

The paper portion 201 is, for example, sheet-like paper in which the wireless tag 202 is embedded.

The wireless tag 202 communicates with the reader and writer 103. Data is written on the wireless tag 202 by this communication. The wireless tag 202 is, for example, a radio frequency (RF) tag using a radio frequency identifier (RFID). The wireless tag 202 is typically a passive type that operates by using received radio waves as a power source.

Meanwhile, the untagged medium 210 may be an image forming medium to which a wireless tag is not attached. The untagged medium 210 is, for example, sheet-like paper.

The description refers back to FIG. 1.

The manual feeding tray 112 is a tray for manually feeding the image forming medium.

The paper feeding roller 113 may be rotated by the action of the motor to carry out the image forming medium stored in the paper feeding tray 111 or the manual feeding tray 112 from the paper feeding tray 111 or the manual feeding tray 112.

The toner cartridges 114 store recording materials such as toner to be supplied to the image forming units 115. The image forming apparatus 100 includes one or a plurality of toner cartridges 114. The image forming apparatus 100 includes, for example, four toner cartridges 114, as shown in FIG. 1. The four toner cartridges 114 store recording materials corresponding to colors of cyan, magenta, yellow, and key (black) (CMYK), respectively. The colors of the recording materials stored in the toner cartridges 114 are not limited to CMYK and may be other colors. The recording materials stored in the toner cartridges 114 may be a special recording material. For example, the toner cartridges 114 store decolorable recording materials that are decolored at a temperature higher than a predetermined temperature to be in an invisible state.

The image forming apparatus 100 includes one or more image forming units 115. The image forming apparatus 100 includes, for example, four image forming units 115 as shown in FIG. 1. The four image forming units 115 form an image with recording materials corresponding to colors of CMYK, respectively.

Each of the image forming units 115 includes a photosensitive drum and a developing device. The developing device develops an electrostatic latent image on the photosensitive drum by using the recording material supplied from the toner cartridge 114. As a result, a toner image is formed on the photosensitive drum. The images formed on the photosensitive drums are transferred (primarily transferred) to the transfer belt 117 by the contact with the transfer belt 117.

The optical scanning device 116 is also referred to as a laser scanning unit (LSU) or the like. The optical scanning device 116 forms an electrostatic latent image on the photosensitive drum surface of each image forming unit 115 by controlling the laser light in response to the input image data.

The transfer belt 117 is, for example, an endless belt and can be rotated by the action of a roller. The transfer belt 117 conveys the image transferred from each of the image forming units 115 to the position of the secondary transfer roller 118 by the rotation.

The secondary transfer roller 118 includes two rollers facing each other. The secondary transfer rollers 118 transfer (secondarily transfer) the image formed on the transfer belt 117 to the image forming medium passing between the secondary transfer rollers 118.

The fixing unit 119 heats and pressurizes the image forming medium to which the image is transferred. Therefore, the image transferred to the image forming medium is fixed. The fixing unit 119 includes a heating unit 1191 and a pressure roller 1192 facing with each other.

The heating unit 1191 is, for example, a roller including a heat source for heating the heating unit 1191. The heat source may be, for example, a heater. The roller heated by the heat source heats the image forming medium. Alternatively, the heating unit 1191 may have a film-like endless belt suspended on a plurality of rollers.

The pressure roller 1192 pressurizes the image forming medium passing between the pressure roller 1192 and the heating unit 1191.

The double side unit 120 causes the image forming medium to be in a state where printing can be performed on the back surface. For example, the double side unit 120 reverses the front and back of the image forming medium by switching back the image forming medium by using a roller or the like. The front surface of the image forming medium is a surface on the side on which an image is formed without being reversed by the double side unit 120. The back surface of the image forming medium is a surface on the side on which an image is formed in a state of being reversed once by the double side unit 120.

The double side unit 120 is an example of a reversing unit that reverses the front and back of the tag built-in medium 200.

The conveyance roller 121 conveys the image forming medium by rotation due to the action of a motor.

The discharge tray 122 is a holder on which the image forming medium discharged to the outside of a housing after the completion of printing is placed. If the image forming medium is discharged to the discharge tray 122 without being reversed by the double side unit 120, the image forming medium is discharged so that the front surface faces downward. If the image forming apparatus 100 performs printing in ascending order from the smallest page number to the largest page number by discharging the image forming medium so that the front surface faces downward, the order of the image forming medium is arranged in the page order.

Figure 3:
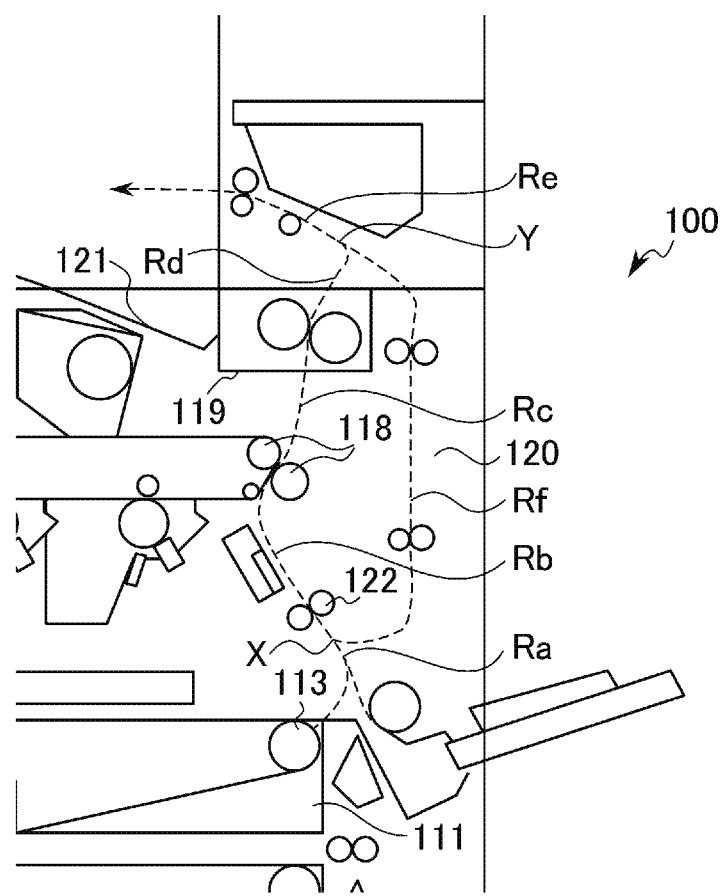
FIG. 3 is a diagram for describing a conveyance path of an image forming medium.

FIG. 3 is a diagram for describing the conveyance path of the image forming medium. FIG. 3 is an enlarged view of a part of the image forming apparatus 100 shown in FIG. 1.

The image forming medium passes through a path R by actions of the paper feeding roller 113, the double side unit 120, and the conveyance roller 121. The path R includes a path Ra to a path Re.

The path Ra is a path from the paper feeding tray 111 to a point X where the image forming medium passing through the double side unit 120 joins.

The path Rb is a path from the point X to the secondary transfer rollers 118.

The path Rc is a path from the secondary transfer rollers 118 to the fixing unit 119.

The path Rd is a path from the fixing unit 119 to a point Y which is an entrance of the double side unit 120.

The path Re is a path from the point Y to the discharge tray 122.

The path Rf is a path passing through the double side unit 120 from the point Y to the point X.

If the image forming medium is discharged without being reversed by the double side unit 120, the image forming apparatus 100 may convey the image forming medium in an order of the paper feeding tray 111, the path Ra, the point X, the path Rb, the secondary transfer rollers 118, the path Rc, the fixing unit 119, the path Rd, the point Y, the path Re, and the discharge tray 122.

If the image forming medium is reversed by the double side unit 120, the image forming apparatus 100 conveys the image forming medium in an order of the paper feeding tray 111, the path Ra, the point X, the path Rb, the secondary transfer rollers 118, the path Rc, the fixing unit 119, the path Rd, the point Y, and the path Re. Thereafter, the image forming apparatus 100 switches back the image forming medium by the action of the double side unit 120 to convey the image forming medium in an order of the path Re, the point Y, the path Rf, the point X, and the path Rb. The image forming apparatus 100 may further convey the image forming medium in an order of the path Rb, the secondary transfer rollers 118, the path Rc, the fixing unit 119, the path Rd, the point Y, and the path Re. Here, if the image forming apparatus 100 discharges the image forming medium, the image forming medium is discharged to the discharge tray 122. Meanwhile, if the image forming medium is reversed again, the image forming apparatus 100 again switches back the image forming medium and conveys the image forming medium through the same path.

The scanner 102 in FIG. 1 reads an image from a manuscript. The scanner 102 is an optical reduction system including an imaging element such as a charge-coupled device (CCD) image sensor, for example. Alternatively, the scanner 102 is a contact image sensor (CIS) system including an imaging element such as a complementary metal-oxide-semiconductor (CMOS) image sensor. Alternatively, the scanner 102 may be any other known system.

The reader and writer 103 includes an antenna 1031. The reader and writer 103 communicates with the wireless tag 202 by using the antenna 1031. The antenna 1031 transmits the radio wave to the wireless tag 202. The antenna 1031 receives the radio wave transmitted from the wireless tag 202.

As shown in FIG. 1, the reader and writer 103 can communicate with the wireless tag 202 passing through a portion from the paper feeding tray 111 to the secondary transfer rollers 118 and may be provided at a position where communication with the wireless tag 202 reversed by the double side unit 120 can be performed. Alternatively, the reader and writer 103 may be provided at another position. For example, the reader and writer 103 is provided at a position where communication with the wireless tag 202 passing through the secondary transfer rollers 118, a portion from the secondary transfer rollers 118 to the fixing unit 119, the fixing unit 119, or a portion from the fixing unit 119 to the discharge tray 122 can be performed, and communication with the wireless tag 202 reversed by the double side unit 120 can be performed.

The reader and writer 103 demodulates the radio wave transmitted from the wireless tag 202 and received by the antenna 1031. Therefore, the reader and writer 103 reads the information recorded in the wireless tag 202. The reader and writer 103 modulates the radio wave transmitted from the antenna 1031 to the wireless tag 202 and transmits the information to the wireless tag 202. Therefore, the reader and writer 103 can write information on the wireless tag 202. As described above, the reader and writer 103 has a function as a reader for reading information recorded in the wireless tag 202 and a function as a writer for writing information on the wireless tag 202.

The reader and writer 103 is an example of a writing unit that writes data on the wireless tag 202.

The operation panel 104 may include a man-machine interface that performs input and output between the image forming apparatus 100 and an operator of the image forming apparatus 100. The operation panel 104 includes, for example, a touch panel 1041 and an input device 1042.

The touch panel 1041 may be provided by stacking a display such as a liquid crystal display or an organic electroluminescence (EL) display and a pointing device that receives an input by touch. The display included in the touch panel 1041 functions as a display device that displays a screen for notifying the operator of the image forming apparatus 100 of various kinds of information. The touch panel 1041 functions as an input device that receives the touch operation by the operator.

The input device 1042 receives the operation by the operator of the image forming apparatus 100. The input device 1042 is, for example, a button, a keyboard, a keypad, or a touchpad.

Figure 4:
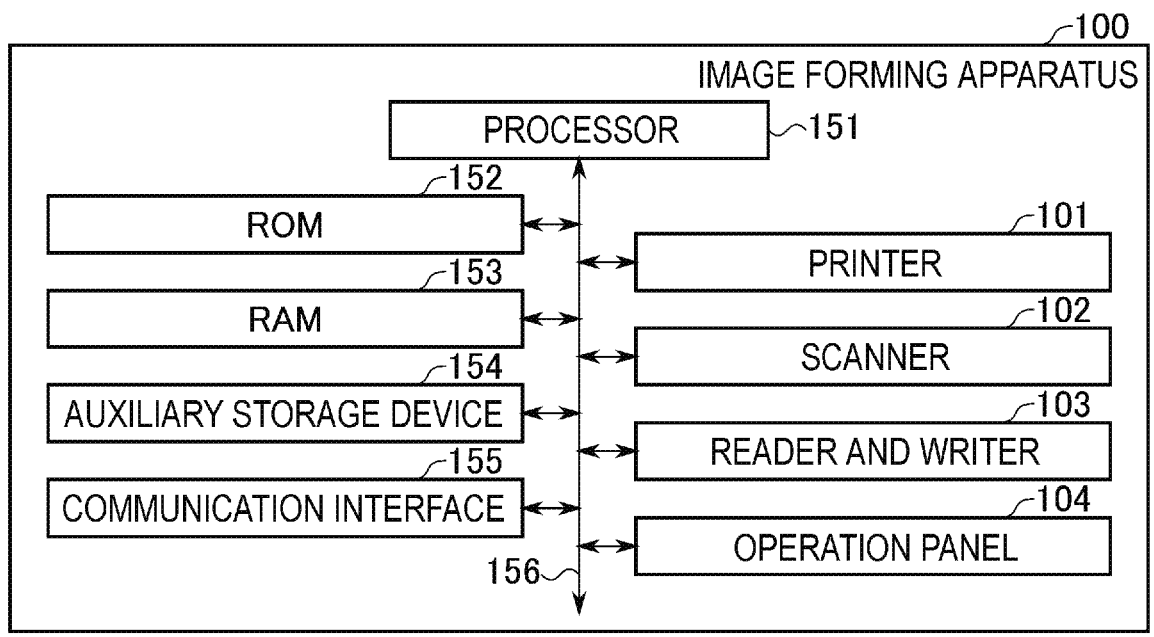
FIG. 4 is a block diagram showing a main circuit configuration of the image forming apparatus in FIG. 1.

FIG. 4 is a block diagram showing the main circuit configuration of the image forming apparatus 100.

The image forming apparatus 100 may include, for example, a processor 151, a read-only memory (ROM) 152, a random-access memory (RAM) 153, an auxiliary storage device 154, a communication interface 155, the printer 101, the scanner 102, the reader and writer 103, and the operation panel 104. Also, a bus 156, for example, connects these units.

The processor 151 corresponds to a central part of a computer that performs processing such as arithmetic and control necessary for the operation of the image forming apparatus 100. The processor 151 controls each unit so that various functions of the image forming apparatus 100 can be realized based on programs such as firmware, system software, and application software stored in the ROM 152, the auxiliary storage device 154, or the like. The processor 151 executes the processing described below based on the program. A portion or all of the programs may be incorporated in the circuit of the processor 151. The processor 151 may be, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 151 may be a combination of a plurality of these units.

The ROM 152 corresponds to a main memory device of the computer with the processor 151 as amain component.

The ROM 152 is a non-volatile memory used exclusively for reading data. The ROM 152 stores, for example, firmware among the above programs. The ROM 152 also stores data, for example, used by the processor 151 to perform various processes.

The RAM 153 corresponds to a main memory device of the computer with the processor 151 as the main component. The RAM 153 is a memory used for reading and writing data. The RAM 153 is used as a work area, for example, for storing data temporarily used by the processor 151 to perform various processes. The RAM 153 is typically a volatile memory.

The auxiliary storage device 154 corresponds to the auxiliary storage device of the computer with the processor 151 as the main component. The auxiliary storage device 154 is, for example, an electric erasable programmable read-only memory (EEPROM), a hard disk drive (HDD), or a flash memory. The auxiliary storage device 154 stores, for example, system software and application software among the above programs. The auxiliary storage device 154 stores data used by the processor 151 to perform various processes, data generated by the processing in the processor 151, and various setting values. The image forming apparatus 100 may include an interface capable of inserting a storage medium such as a memory card or a universal serial bus (USB) memory as the auxiliary storage device 154. The interface reads and writes information with respect to the storage medium.

The communication interface 155 is an interface for the communication by the image forming apparatus 100 via a network including a local area network (LAN) or the Internet.

The bus 156 may include a control bus, an address bus, a data bus, for example, and transmits signals transmitted and received by each part of the image forming apparatus 100.

Figure 5:
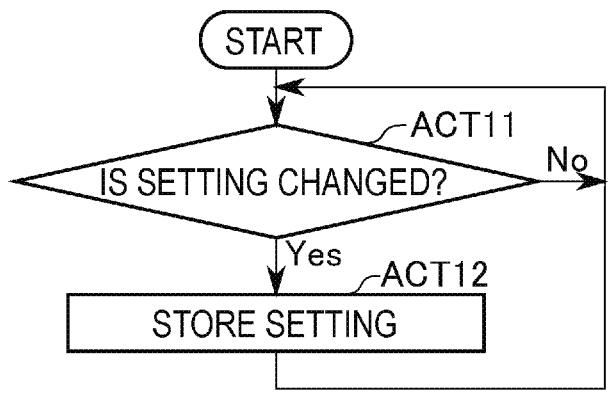
FIG. 5 is a flowchart showing an example of processing by a processor in FIG. 4.
Figure 6:
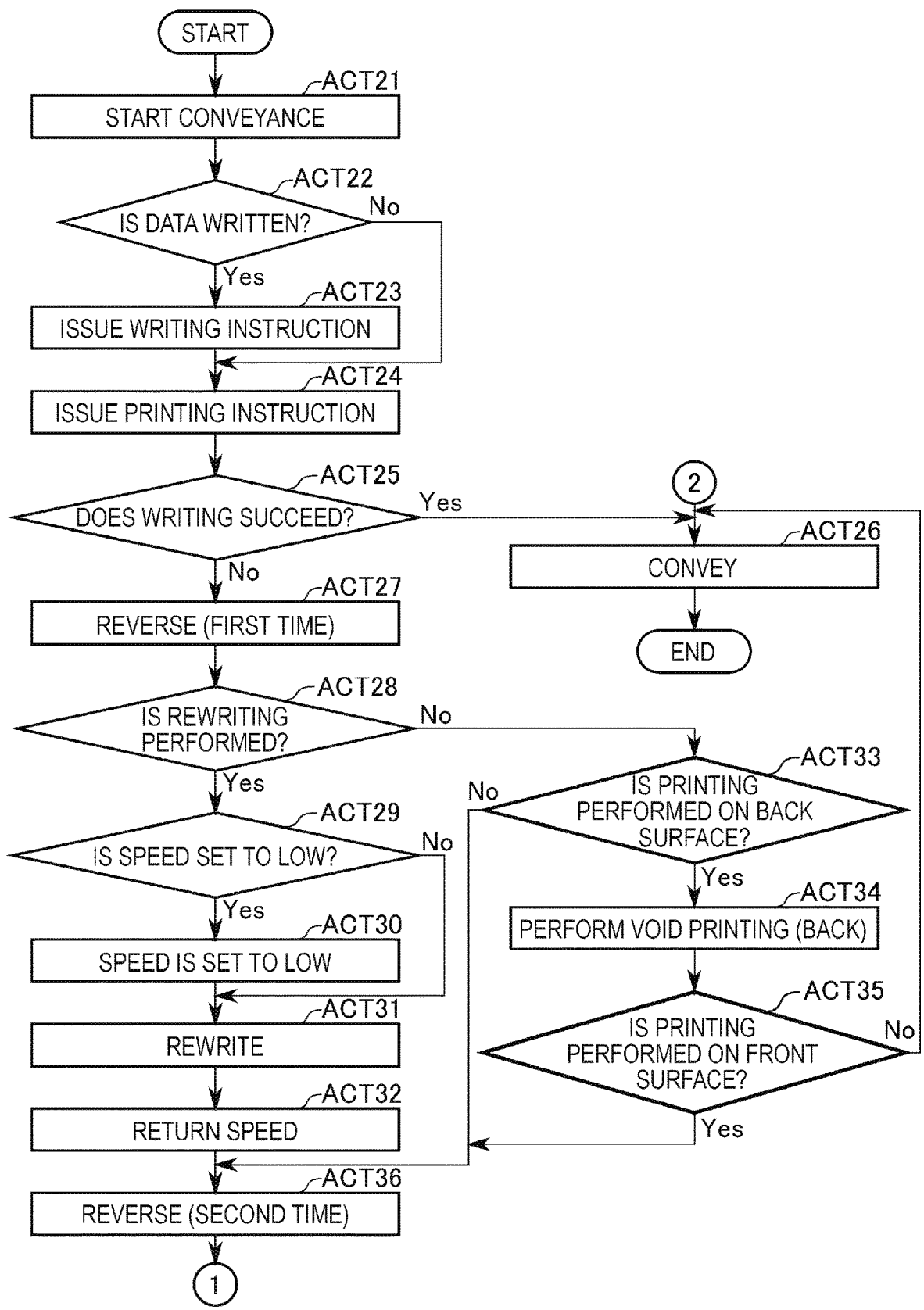
FIG. 6 is a flowchart showing an example of the processing by the processor in FIG. 4.
Figure 7:
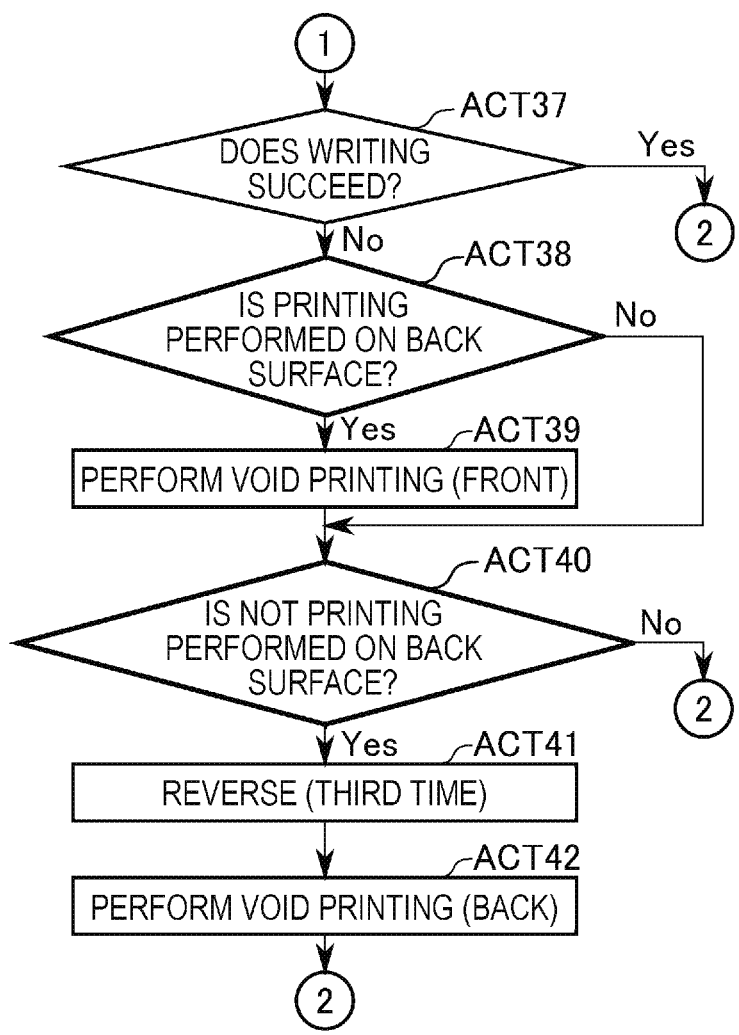
FIG. 7 is a flowchart showing an example of the processing by the processor in FIG. 4.
Figure 8:
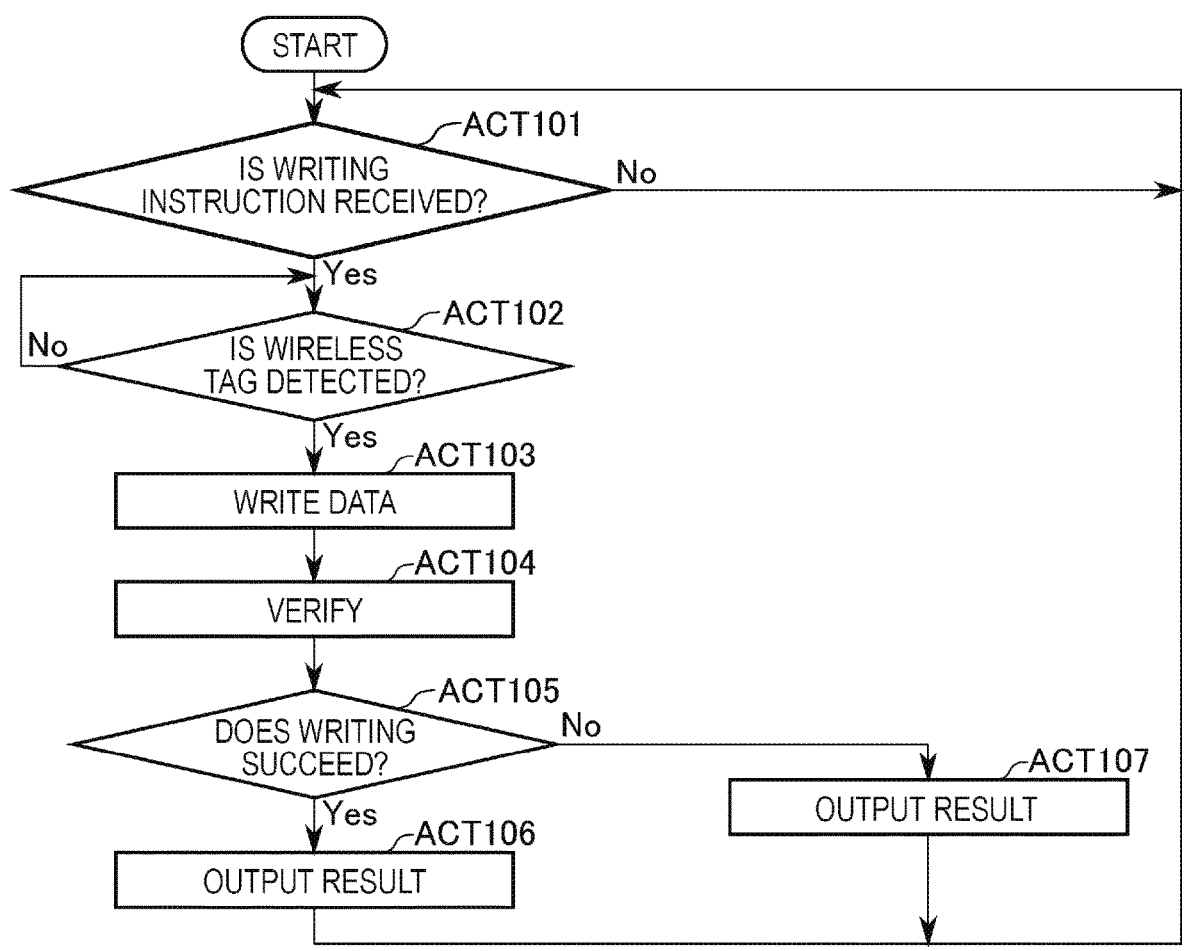
FIG. 8 is a flowchart showing an example of processing by a reader and writer in FIG. 4.

Hereinafter, the operation of the image forming apparatus 100 according to at least one embodiment will be described with reference to FIGS. 5 to 8. The content of the processing in the description of the following operation is an example, and various processes that can obtain the same result can be appropriately used. FIGS. 5 to 7 are flowcharts showing an example of the processing by the processor 151 of the image forming apparatus 100. The processor 151 executes the processing shown in FIGS. 5 to 7 based on the program stored, for example, in the ROM 152 or the auxiliary storage device 154. FIG. 8 is a flowchart showing an example of the processing by the reader and writer 103 of the image forming apparatus 100. The controller included in the reader and writer 103, for example, execute the processing in FIG. 8 based on the program stored in the memory included in the reader and writer 103.

The processor 151 of the image forming apparatus 100 starts the processing shown in FIG. 5, for example, along with the activation of the image forming apparatus 100.

The processor 151 of the image forming apparatus 100 in ACT 11 of FIG. 5 waits for an instruction to change the setting of the image forming apparatus 100. The processor 151 determines that an instruction to change the setting is issued, for example, in response to an input of an instruction to change the setting for the operation panel 104. Alternatively, the processor 151 determines that an instruction to change the setting is issued in response to the reception of information for inputting an instruction to change the setting by the communication interface 155. The setting of the image forming apparatus 100 includes, for example, three settings of (1) to (3) as below.

(1) Settings of the surface to be subjected to void printing

The setting of (1) can be selected from three kinds of surface, for example, the front surface, the back surface, and both surfaces.

(2) Setting of whether or not to retry writing if writing of data on the wireless tag 202 fails The setting of (2) can be selected from two kinds, for example, retrying and no retrying.

(3) Setting of whether or not to retry writing data on the wireless tag 202 in a state where the conveyance speed of the image forming medium is set to a low speed.

The setting of (3) can be selected from two kinds, for example, setting to low speed and no setting to low speed.

If an operation of changing the setting is performed, the processor 151 determines Yes in ACT 11 and proceeds to ACT 12.

In ACT 12, the processor 151 stores the setting content such as (1) to (3) described above in the auxiliary storage device 154 based on the instruction to change the setting. After the process of ACT 12, the processor 151 returns to ACT 11.

With respect to the setting of (1) to (3), for example, the processor 151 stores the setting value as described below to the auxiliary storage device 154 or the like. The name and logical type of each setting are not limited, and other examples are contemplated.

(1)

In case of the setting of performing the void printing on the front surface, the processor 151, for example, sets a value of a flag front to be true and sets a value of a flag back to be false. The flag front is a flag indicating that the void printing is performed on the front surface. The flag back is a flag indicating that the void printing is performed on the back surface.

In case of the setting of performing the void printing on the back surface, the processor 151 sets the value of the flag front to be false and sets the value of the flag back to be true.

In case of the setting of performing the void printing on both of the surfaces, the processor 151 sets the value of the flag front to be true and sets the value of the flag back to be true.

If the value of the flag front is set to be true, the image forming apparatus 100 is set to perform the first operation. If the value of the flag back is set to be true, the image forming apparatus 100 is set to perform the second operation.

(2)

In case of setting of retrying the writing of data on the wireless tag 202, the processor 151 sets a value of a flag rewrite to be true. The flag rewrite is a flag indicating that retry is performed.

In case of setting of not retrying the writing of data on the wireless tag 202, the processor 151 sets the value of the flag rewrite to be false.

(3)

If the conveyance speed of the image forming medium is set to be low in case of retrying the writing of data on the wireless tag 202, the processor 151 sets a value of a flag slow to be true. The flag slow is a flag indicating that the conveyance speed of the image forming medium is set to be low in case of retrying the writing of data on the wireless tag 202.

If the conveyance speed of the image forming medium is set to not be low in case of retrying the writing of data on the wireless tag 202, the processor 151 sets the value of the flag slow to be false.

The processor 151 of the image forming apparatus 100 starts the processing shown in FIG. 6, for example, along with the start of a job using a data writing function. The processing shown in FIG. 6 shows processing for one tag built-in medium 200. Accordingly, if the plurality of the tag built-in mediums 200 is used in the job, the processor 151 performs the job by performing the processing shown in FIG. 6 on one tag built-in medium 200 once. In the description below, the processing for one tag built-in medium 200 is described, but in practice, the image forming apparatus 100 performs the processing for the number of the tag built-in medium 200 used.

In ACT 21, the processor 151 controls the paper feeding roller 113 and the conveyance roller 121 to start conveyance of the tag built-in medium 200. The processing on the tag built-in medium 200 in the processes of ACT 22 to ACT 42 below is processing on the tag built-in medium 200 that is started to be conveyed in ACT 21.

In ACT 22, the processor 151 refers to the job being executed and determines whether or not to write the data on the tag built-in medium 200 being conveyed. If the data is written on the tag built-in medium 200 being conveyed, the processor 151 determines Yes in ACT 22 and proceeds to ACT 23.

In ACT 23, the processor 151 transmits the data writing instruction to the reader and writer 103. The data writing instruction is information for inputting an instruction to write the data on the wireless tag 202. The data writing instruction includes the data to be written on the wireless tag 202. The reader and writer 103 receives the corresponding data writing instruction.

Meanwhile, in ACT 101 of FIG. 8, the reader and writer 103 of the image forming apparatus 100 waits for the reception of the instruction to write the data. If the data writing instruction is received, the reader and writer 103 determines Yes in ACT 101 and proceeds to ACT 102.

In ACT 102, the reader and writer 103 detects that the wireless tag 202 of the conveyed tag built-in medium 200 enters the communicate area of the antenna 1031. If the wireless tag 202 is not detected, the reader and writer 103 determines No in ACT 102 and repeats ACT 102. If the wireless tag 202 is detected, the reader and writer 103 determines Yes in ACT 102 and proceeds to ACT 103.

In ACT 103, the reader and writer 103 writes the data on the wireless tag 202 detected in ACT 102.

In ACT 104, the reader and writer 103 performs verification. In other words, the reader and writer 103 examines whether or not the writing of data on the wireless tag 202 succeeds. For example, if the data written on the wireless tag 202 is the same as the data to be written, the reader and writer 103 determines that the writing has succeeded. Then, if the data written on the wireless tag 202 is different from the data to be written and if the communication with the wireless tag 202 cannot be normally performed, the reader and writer 103 determines that the writing has failed.

In ACT 105, the reader and writer 103 determines whether or not the writing of data on the wireless tag 202 has succeeded. If the result of the verification in ACT 104 indicates that the writing of data has succeeded, the reader and writer 103 determines Yes in ACT 105 and proceeds to ACT 106.

In ACT 106, the reader and writer 103 outputs success information indicating that the writing of data has succeeded. The success information is input to the processor 151. After the process of ACT 106, the reader and writer 103 returns to ACT 101.

On the other hand, if the verification result in ACT 104 does not indicate that the writing of data succeeds, the reader and writer 103 determines No in ACT 105 and proceeds to ACT 107.

In ACT 107, the reader and writer 103 outputs failure information indicating that the writing of data fails. The failure information is input to the processor 151. After the process of ACT 107, the reader and writer 103 returns to ACT 101.

Meanwhile, after the process of ACT 23 of FIG. 6, the processor 151 proceeds to ACT 24. If the data is not written on the tag built-in medium 200 being conveyed, the processor 151 determines No in ACT 22 and proceeds to ACT 24.

In ACT 24, the processor 151 controls the printer 101 to form (print) an image indicated by the job being executed on the paper portion 201 of the tag built-in medium 200.

In ACT 25, the processor 151 determines whether or not the writing of data on the wireless tag 202 succeeds. If the input of the success information is received from the reader and writer 103, the processor 151 determines Yes in ACT 25 and proceeds to ACT 26.

In ACT 26, the processor 151 controls the conveyance roller 121 or the like to discharge the tag built-in medium 200 to the discharge tray 122. After the process of ACT 26, the processor 151 ends the processing shown in FIGS. 6 and 7.

On the other hand, if the input of the failure information is received from the reader and writer 103, the processor 151 determines No in ACT 25 and proceeds to ACT 27.

In ACT 27, the processor 151 controls the double side unit 120, the conveyance roller 121, and the like to reverse the tag built-in medium 200. The reversing is reversing for the first time.

In ACT 28, the processor 151 determines whether or not to retry the writing of data on the wireless tag 202. For example, if the value of the flag rewrite is true, the processor 151 determines Yes in ACT 28 and proceeds to ACT 29.

In ACT 29, the processor 151 determines whether or not the conveyance speed is set to be low. If the value of the flag slow is true, the processor 151 determines Yes in ACT 29 and proceeds to ACT 30.

In ACT 30, the processor 151 controls the conveyance roller 121 and the like to set the conveyance speed to be low. After the process of ACT 30, the processor 151 proceeds to ACT 31. If the value of the flag slow is false, the processor 151 determines No in ACT 29 and proceeds to ACT 31.

In ACT 31, the processor 151 retries the writing of data on the wireless tag 202. That is, in the same manner as in ACT 23, the processor 151 transmits the data writing instruction to the reader and writer 103. Accordingly, the reader and writer 103 receives the writing instruction and executes the processes of ACT 102 to ACT 107 of FIG. 8. The reader and writer 103 inputs the success information or the failure information to the processor 151 in response to the success or the failure of the writing of data.

In ACT 32 of FIG. 6, the processor 151 returns the conveyance speed to the speed before the process of ACT 30. Here, if the processor 151 determines No in ACT 29 and the process of ACT 30 is not performed, the processor 151 does not change the conveyance speed in ACT 32.

If the value of the flag rewrite is false, the processor 151 determines No in ACT 28 and proceeds to ACT 33.

In ACT 33, the processor 151 determines whether or not void printing is performed on the back surface of the tag built-in medium 200. For example, if the value of the flag back is true, the processor 151 determines Yes in ACT 33 and proceeds to ACT 34.

In ACT 34, the processor 151 controls the printer 101 to perform void printing on the tag built-in medium 200. At this point, the tag built-in medium 200 is in a state of being reversed once, and thus this void printing is void printing on the back surface.

In ACT 35, the processor 151 determines whether or not void printing is performed on the front surface of the tag built-in medium 200. For example, if the value of the flag front is false, the processor 151 determines No in ACT 35 and proceeds to ACT 26. Accordingly, the tag built-in medium 200 in which void printing is performed on the back surface and void printing is not performed on the front surface is discharged to the discharge tray 122.

After the process of ACT 32, the processor 151 proceeds to ACT 36. If the value of the flag back is false, the processor 151 determines No in ACT 33 and proceeds to ACT 36. If the value of the flag front is true, the processor 151 determines Yes in ACT 35 and proceeds to ACT 36.

In ACT 36, the processor 151 controls the double side unit 120, the conveyance roller 121, and the like to reverse the tag built-in medium 200. This reversing is reversing for the second time. After the process of ACT 36, the processor 151 proceeds to ACT 37 of FIG. 7.

In ACT 37, the processor 151 retries the writing of data to determine whether or not the writing of the data succeeds. If the input of the success information is received from the reader and writer 103, the processor 151 determines Yes in ACT 37 and proceeds to ACT 26 of FIG. 6. On the other hand, if the input of failure information is received from the reader and writer 103, the processor 151 determines No in ACT 37 of FIG. 7 and proceeds to ACT 38. Even if the writing of data is not retried, that is, even if the value of the flag rewrite is false, the processor 151 determines No in ACT 37 and proceeds to ACT 38.

In ACT 38, the processor 151 determines whether or not void printing is performed on the front surface of the tag built-in medium 200. If the value of the flag front is true, the processor 151 determines Yes in ACT 38 and proceeds to ACT 39.

In ACT 39, the processor 151 controls the printer 101 to perform void printing on the tag built-in medium 200. At this point, the tag built-in medium 200 is in a state of being reversed twice, and thus this void printing is void printing on the front surface.

As described above, the processor 151 performs the processing shown in FIGS. 5 and 6 and thus functions as an example of a control unit that controls the double side unit 120 so that the tag built-in medium 200 is reversed twice if the writing of data on the wireless tag 202 fails. The processor 151 performs the processing shown in FIGS. 5 and 6 and thus functions as an example of a control unit that controls the printer 101 so that void printing is performed on the tag built-in medium 200 reversed twice.

After the process of ACT 39, the processor 151 proceeds to ACT 40. If the value of the flag front is false, the processor 151 determines No in ACT 38 and proceeds to ACT 40.

In ACT 40, the processor 151 is set to perform void printing on the back surface of the tag built-in medium 200 but determines whether or not void printing is not yet performed on the back surface. For example, if any one of the value of the flag rewrite and the value of the flag back is false, the processor 151 determines No in ACT 40 and proceeds to ACT 26 of FIG. 6. On the other hand, if both of the value of the flag rewrite and the value of the flag back are true, the processor 151 determines Yes in ACT 40 of FIG. 7 and proceeds to ACT 41.

In ACT 41, the processor 151 controls the double side unit 120, the conveyance roller 121, and the like to reverse the tag built-in medium 200. This reversing is reversing for the third time.

In ACT 42, the processor 151 controls the printer 101 to perform the void printing on the tag built-in medium 200. At this point, the tag built-in medium 200 is in a state of being reversed three times, and thus this void printing is void printing on the back surface. After the process of ACT 42, the processor 151 proceeds to ACT 26 of FIG. 6.

If the writing of data on the wireless tag 202 fails, the image forming apparatus 100 of at least one embodiment reverses the tag built-in medium 200 twice and performs void printing on the front surface of the tag built-in medium 200. Accordingly, the user of the image forming apparatus 100 may more easily recognize that void printing is performed compared to a case where void printing is performed on the back surface of the tag built-in medium 200. The user who recognizes that void printing is performed on the tag built-in medium 200 recognizes that the writing of data on the wireless tag 202 fails.

If the writing of data on the wireless tag 202 fails, the image forming apparatus 100 of at least one embodiment can select the setting on whether to perform void printing on the front surface of the tag built-in medium 200 or perform void printing on the back surface. Accordingly, a user who recognizes void printing more easily if the void printing is performed on the back surface can set to perform void printing on the back surface. Also, a user who recognizes void printing more easily if void printing is performed on the front surface can set to perform void printing on the front surface. Therefore, a user easily recognizes that void printing is performed.

If the writing of data on the wireless tag 202 fails, the image forming apparatus 100 of at least one embodiment performs void printing on both surfaces of the front surface and the back surface of the tag built-in medium 200. Accordingly, a user easily recognizes that void printing is performed.

If the writing of data on the wireless tag 202 fails, the image forming apparatus 100 of at least one embodiment retries the writing of the data on the wireless tag 202. Therefore, if the writing of data fails even upon the retry, the image forming apparatus 100 of at least one embodiment performs at least one void printing on at least any one of the front surface or the back surface of the tag built-in medium 200. Accordingly, the image forming apparatus 100 of at least one embodiment retries the writing of data on the wireless tag 202, the number of the tag built-in mediums 200, in which the writing of data fails, discharged can be reduced.

The above at least one embodiment can be modified as follows.

In the above at least one embodiment, the reader and writer 103 is provided at a position where the communication with the wireless tag 202 reversed by the double side unit 120 can be performed. However, the reader and writer 103 may be provided at another position. Here, the image forming apparatus provided with the reader and writer 103 only at a position excluding the position where the communication with the wireless tag 202 reversed by the double side unit 120 can be performed cannot retry the writing of data on the wireless tag 202.

The image forming apparatus of at least one embodiment may include two or more reader and writers 103. Also, one reader and writer 103 may include two antennas 1031.

In the above embodiment, a portion of the processing performed by the reader and writer 103 may be performed by the processor 151. A portion of the processing performed by the processor 151 in the above embodiment may be performed by the reader and writer 103.

The processor 151 may be a processor in which a portion or all of the processing realized by the program in the above at least one embodiment may be realized by the hardware configuration of the circuit.

Each device in the above at least one embodiment is transferred to, for example, the administrator of each device or the like in a state where the programs for executing the above processes are stored. Alternatively, the devices are transferred to the corresponding administrator or the like in a state where the programs are not stored. Then, the programs are separately transferred to the corresponding administrator or the like and stored in each device based on the operation by the administrator or the service man. The transfer of the programs at this point can be realized, for example, by using a removable storage medium such as a disk media or a semiconductor memory, or by downloading via the Internet or a LAN.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
a printer configured to form an image on a sheet-like medium to which a wireless tag is attached;
a double side configured to reverse a front and back of the medium;
a writer configured to write data on the wireless tag; and
a controller configured to control the double side so that the medium is reversed upon the writing of data on the wireless tag failing and to control the printer so that an image indicating that the writing of data fails is formed on the medium reversed twice.

2. The apparatus according to claim 1,
wherein the image indicating that the writing of data fails comprises void printing.

3. The apparatus according to claim 1,
wherein the writer is disposed at a position where communication with the wireless tag reversed by the double side is performed.

4. The apparatus according to claim 1,
wherein the writer comprises a plurality of writers.

5. The apparatus according to claim 1,
wherein the writer comprises a plurality of antennas.

6. The apparatus according to claim 1,
wherein the controller is configured to: control the printer so that an image indicating that the writing of data fails is formed on the medium reversed twice upon the writing of data on the wireless tag failing in a state of setting a first operation, and control the printer so that an image indicating that the writing of data fails is formed on the medium reversed once upon the writing of data on the wireless tag failing in a state of setting a second operation.

7. The apparatus according to claim 1,
wherein the controller is configured to: control the double side so that the medium is reversed upon the writing of data on the wireless tag failing, and control the printer so that an image indicating that the writing of data failing is formed on the medium reversed once and an image indicating the writing of data failing is formed on the medium reversed twice.

8. An image forming apparatus comprising:
a printer configured to form an image on a sheet-like medium to which a wireless tag is attached;
a double side configured to reverse a front and back of the medium;
a writer configured to write data on the wireless tag; and
a controller configured to:
control the double side so that the medium is reversed once upon the writing of data on the wireless tag failing,
control the writer so that the writing of the data on the wireless tag is retried from a start of conveyance of the medium to the double side to discharge the medium outside a housing, and
control the printer so that the medium is reversed and an image indicating that the writing of data fails is formed on the reversed medium upon the writing of data failing even upon the retry.

9. An image forming method comprising:
forming an image on a sheet-like medium to which a wireless tag is attached;
writing data on the wireless tag; and
reversing the medium twice and forming an image indicating that the writing of data fails on the medium reversed twice upon the writing of data on the wireless tag failing.

10. The method according to claim 9, further comprising:
forming an image indicating that the writing of data fails on the medium reversed twice upon the writing of data on the wireless tag failing in a state of setting a first operation, and
forming an image indicating that the writing of data fails on the medium reversed once upon the writing of data on the wireless tag failing in a state of setting a second operation.

11. The method according to claim 9, further comprising:
reversing the medium upon the writing of data on the wireless tag failing, and
forming on the medium reversed once an image indicating that the writing of data failing, and forming on the medium reversed twice an image indicating the writing of data failing.

* * * * *